(12) United States Patent
Hirth et al.

(10) Patent No.: US 8,689,545 B2
(45) Date of Patent: Apr. 8, 2014

(54) DEVICE FOR EVAPORATING A FLUID

(71) Applicant: EMITEC Gesellschaft für Emissionstechnologie mbH, Lohmar (DE)

(72) Inventors: Peter Hirth, Rösrath (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/644,145

(22) Filed: Oct. 3, 2012

(65) Prior Publication Data

US 2013/0028804 A1    Jan. 31, 2013

Related U.S. Application Data

(60) Division of application No. 12/621,698, which is a continuation of application No. PCT/EP2008/056233, filed on May 21, 2008, now Pat. No. 8,303,766.

(30) Foreign Application Priority Data

May 22, 2007  (DE) .................. 10 2007 024 081

(51) Int. Cl.
*F01N 3/00* (2006.01)
*F01N 3/10* (2006.01)
*B01D 1/22* (2006.01)

(52) U.S. Cl.
USPC .............................. 60/295; 60/301; 159/13.1

(58) Field of Classification Search
USPC ........ 60/285, 295, 301; 159/5, 13.1, 43.1, 44, 159/47.2
See application file for complete search history.

(56) References Cited

U.S. PATENT DOCUMENTS 3,291,198 A    12/1966  Timson
3,705,794 A    12/1972  Czurak et al.
(Continued)

FOREIGN PATENT DOCUMENTS

DE    10 2005 011 657 A1    9/2006
EP         1748162 A1    1/2007
(Continued)

OTHER PUBLICATIONS

Dr. Jacob, E, "Perspektiven der mobilen SCR-Technik" [Perspectives on Mobile SCR Technology] 15. Aachner Kolloquium Fahrzeug- und Motorentechnik 2006, Emitec GmbH, Lohmar, Germany, pp. 1-32—English abstract.

(Continued)

*Primary Examiner* — Audrey K Bradley
(74) *Attorney, Agent, or Firm* — Laurence A. Greenberg; Werner H. Stemer; Ralph E. Locher

(57) ABSTRACT

A device for evaporating a predeterminable volume of fluid provides for successive addition of partial volumes of the predeterminable volume to a supply line at different adding rates, at least partially evaporating the partial volumes forming a vapor film between them and a supply line wall, conveying the partial volumes through the supply line to an evaporator surface, and applying the partial volumes to an evaporator surface region varying as a function of mass and/or volume adding rate of the partial volume, permitting effective evaporation of fluid, particularly urea/water solution. Utilization of the highest possible proportion of evaporator surfaces is achieved by mass and/or volume addition rate-dependent distribution of impingement surfaces on the evaporator surface. This heating strategy in the supply line region ensures the Leidenfrost effect when individual partial volumes are added. As even a distribution as possible is achieved using a corresponding geometrical configuration of the evaporator channel.

9 Claims, 3 Drawing Sheets

(56) References Cited

U.S. PATENT DOCUMENTS

| | | |
|---|---|---|
| 4,007,094 A | 2/1977 | Greenfield et al. |
| 4,076,577 A | 2/1978 | Hetzel et al. |
| 4,231,839 A | 11/1980 | Barron et al. |
| 5,753,188 A * | 5/1998 | Shimoda et al. .............. 422/108 |
| 6,107,440 A | 8/2000 | Hachiya et al. |
| 6,821,490 B2 | 11/2004 | Platvoet |
| 2002/0011069 A1 | 1/2002 | Maus et al. |
| 2004/0098979 A1 | 5/2004 | Hammerle et al. |
| 2006/0191254 A1* | 8/2006 | Bui et al. ........................ 60/286 |
| 2006/0275192 A1 | 12/2006 | Gabrielsson et al. |
| 2007/0036694 A1 | 2/2007 | Nishioka et al. |
| 2007/0175208 A1 | 8/2007 | Bandl-Konrad et al. |
| 2008/0092526 A1 | 4/2008 | Kunkel et al. |
| 2009/0159132 A1* | 6/2009 | Gerlach ............................ 137/2 |

FOREIGN PATENT DOCUMENTS

| | | | |
|---|---|---|---|
| WO | WO 2005061866 A1 * | 7/2005 | ............... F01N 3/20 |
| WO | 2006/014129 A1 | 2/2006 | |

OTHER PUBLICATIONS

International Search Report.

* cited by examiner

DEVICE FOR EVAPORATING A FLUID

CROSS-REFERENCE TO RELATED APPLICATION

This is a Divisional of application Ser. No. 12/621,698, filed Nov. 19, 2009, which was a Continuation, under 35 U.S.C. §120, of International Application No. PCT/EP2008/056233, filed May 21, 2008; the application also claims the priority, under 35 U.S.C. §119, of German Patent Application DE 10 2007 024 081.5, filed May 22, 2007; the prior applications are herewith incorporated by reference in their entirety.

BACKGROUND OF THE INVENTION

Field of the Invention

The present invention relates to a device for evaporating a fluid. In particular, the fluid is a urea/water solution which is used as a reducing agent precursor of the reducing agent ammonia in the selective catalytic reduction of nitrogen oxides in the exhaust gas system of internal combustion engines.

In the use of selective catalytic reduction (SCR) for reducing the nitrogen oxide content in the exhaust gas of internal combustion engines, in particular in automobiles, ammonia is often used as a reducing agent acting selectively on nitrogen oxides. In particular in mobile applications, ammonia is generated from urea by thermolysis and/or hydrolysis. Urea is often stored in the form of a urea/water solution and then, as required, either injected in solution form into the exhaust gas system or evaporated outside the exhaust gas and then supplied to the exhaust gas as an ammonia or urea-containing vapor. In the latter case, specifically the evaporation of relatively large volumes in cases of dynamic loads is often a problem, since the application of the evaporation enthalpy to the evaporator drains quite a lot of energy, so that the evaporator cools and the cooling may be so severe that the fluid is no longer fully evaporated.

SUMMARY OF THE INVENTION

It is accordingly an object of the invention to provide a device for evaporating a fluid, which overcomes the hereinafore-mentioned disadvantages and at least some of the drawbacks of the heretofore-known devices of this general type and in which even relatively large volumes of the fluid can be fully evaporated.

With the foregoing and other objects in view there is provided, in accordance with the invention, a method for evaporating a predeterminable volume of a fluid. The method comprises:

a) successively adding at least one first partial volume of the predeterminable volume into a feed line at a first volume adding rate, and successively adding at least one second partial volume of the predeterminable volume, being different from the first partial volume, into the feed line at a second volume adding rate;

b) at least partially evaporating the partial volumes to form a vapor film between the respective partial volume and a wall of the feed line;

c) guiding the partial volumes through the feed line to an evaporator surface; and d) applying the partial volumes to a region of the evaporator surface disposed at a position varying as a function of at least one of the following parameters:
  i) a mass of the corresponding partial volume, or
  ii) a volume adding rate of the corresponding partial volume.

Step a) therefore includes in particular dividing the predeterminable volume into a plurality of partial volumes of different size. This can be carried out by a corresponding control device, so that, prior to addition, a plurality of partial volumes of the predeterminable volume are calculated and the partial volumes are then added into the feed line, for example by way of a correspondingly embodied metering pump. Step a) also includes the case in which the fluid is conveyed continuously into the feed line, with the volume flow being variable over time, so that for this reason first and second partial volumes are successively added into the feed line. In this case, the volume adding rate is varied over time, for example through corresponding variation of the conveying power of a pump and/or through corresponding restrictors, such as for example valves, which can be used to vary the volume adding rate for opening or closing in a time-controlled manner. The amplitude of the volume adding rate can be varied continuously and/or discontinuously. The amplitude of the volume adding rate can remain constant over a predeterminable time period and the length of this time period is preferably variable.

As a result of step d), different regions of the evaporator surface are acted on by the partial volumes of different size as a function of the mass and/or volume adding rate. This leads to more uniform utilization of the evaporator surface and thus to more uniform and not just point-by-point cooling of the evaporator surface. This results in much more complete evaporation than in other systems of the prior art, since the risk of the evaporator surface cooling so intensively as to prevent further evaporation is greatly reduced.

The fluid is particularly preferably a urea/water solution. It is particularly preferable in this regard to employ or use the method for supplying a urea and/or ammonia-containing gas flow to the exhaust gas system of an internal combustion engine, in particular in mobile applications such as for example in automobiles and/or motorcycles.

In accordance with another mode of the method of the invention, the evaporator surface includes the surface of at least one evaporator channel. Preferably, the feed line and evaporator channel are a common channel.

In accordance with a further mode of the method of the invention, it is also preferable for step d) to be based on inertia effects. Thus, a distribution which is as uniform as possible of the partial volumes on the evaporator surface can be achieved due to the different masses of the individual partial volumes while utilizing inertia effects. This can be carried out in particular as a result of the fact that the evaporator channel is curved, changes its radius of curvature and/or that the evaporator channel changes its through-flow cross section.

In accordance with an added mode of the method of the invention, the fluid includes urea in aqueous solution, if appropriate with further additives, for example of formic acid. Aqueous solutions of urea of this type are available under the trademarks Ad Blue® or Denoxium®.

With the objects of the invention in view, there is also provided a device for evaporating a predeterminable volume of a fluid using the method according to the invention. The device comprises a feed line, an evaporator surface for receiving the fluid through the feed line, an evaporator channel having a surface included in the evaporator surface, and at least one variable parameter selected from the group consisting of:

a) a radius of curvature of the evaporator channel,
b) a through-flow cross section of the evaporator channel, and
c) a volume adding rate of the fluid.

By varying the radius of curvature, the curvature and/or the through-flow cross section, it is possible, due to inertia effects, for differently sized partial volumes of the predeterminable volume to impinge at different points of the evaporator surface. Thus, different regions of the evaporator surface are drawn on for applying the evaporation enthalpy and for further heating of the vapor. This prevents point-by-point cooling of the evaporator surface during evaporating of relatively large predeterminable volumes. The variability of the volume adding rate of the fluid is achieved by way of an accordingly activatable conveying device such as for example pumps and/or valves.

In accordance with another feature of the device of the invention, at least a part of the evaporator channel is provided with a porous coating which catalyzes in particular the hydrolysis of a reducing agent precursor to form a reducing agent. Particularly preferably, the feed line and the evaporator channel are made of a material which is corrosion-resistant upon the addition and evaporation of a urea/water solution. In particular, the material can include a corresponding special steel, titanium and/or aluminum.

In accordance with a concomitant feature of the device of the invention, there is preferably provided a conveying device including at least one pump for conveying the fluid from a reservoir into the feed line. Preference is given to the configuration of the pump as a metering pump, the conveying power of which, and thus the volume adding rate of the fluid, is regulatable. Alternatively or additionally, a conveying pump can be embodied as a conveying device through the use of which a conveying power and/or a conveying pressure of the fluid can be predetermined. By varying the conveying power and/or the conveying pressure and activating a corresponding valve embodied between the reservoir and feed line, it is possible to vary the volume adding rate of the fluid.

Other features which are considered as characteristic for the invention are set forth in the appended claims.

Although the invention is illustrated and described herein as embodied in a device for evaporating a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
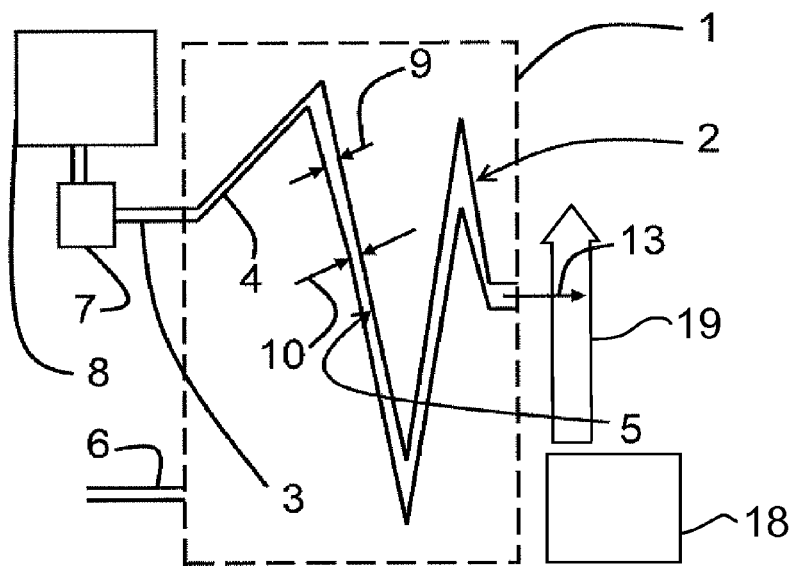
FIG. 1 is a diagrammatic, cross-sectional view of an exemplary embodiment of a device according to the invention illustrating a varying through-flow cross section.

Referring now to the figures of the drawings in detail and first, particularly, to FIG. 1 thereof, there is seen a first exemplary embodiment of a device 1 according to the invention for evaporating a fluid. The device 1 has a channel 2 which may be divided into a feed line 3 and an evaporator channel 4. The feed line 3 serves in this case to supply the fluid, while the evaporator channel 4 has walls serving as evaporator surfaces 5. In this case, the device 1 has a solid body which is made of aluminum and in which the channel 2 is formed, for example by milling. The device 1 also has a non-illustrated electrical heating device which can be supplied with electric current through terminals 6. The device 1 can be electrically heated in this way.

The corresponding fluid can be conveyed from a reservoir 8, through a metering pump 7, into the feed line 3. The conveying power of the metering pump 7, and thus the volume adding rate of the fluid into the feed line 3, is variable. According to the invention, a predeterminable volume of the fluid, in this case a urea/water solution for providing ammonia as a reducing agent in the exhaust gas of internal combustion engines, is to be evaporated. According to the invention, the predeterminable volume, the amount of which may be calculated for example from the nitrogen oxide concentration present in the exhaust gas, is divided in this case into individual partial volumes of different size. Thus, it is for example, possible for there to be formed a first partial volume corresponding to one third of the predeterminable volume and a second partial volume corresponding to two thirds of the predeterminable volume. Other divisions are possible, for example into a first partial volume with one sixth of the predeterminable volume, a second partial volume with two sixths of the predeterminable volume and a third partial volume corresponding to half of the predeterminable volume. In this case, the metering pump 7 can be utilized in an advantageous manner for conveying the partial volumes into the feed line 3 and then into the evaporator channel 4. Alternatively, the volume adding rate of the fluid can be varied, by activating the metering pump 7 accordingly, in such a way that the predeterminable volume is evaporated. In this case, it is also possible in an advantageous manner for the running time of the exhaust gas 19 from the internal combustion engine 18 up to the reaction with ammonia to be utilized and the metering pump 7 to be controlled accordingly.

The corresponding partial volumes are partially evaporated in the evaporator channel 4 or the feed line 3, so that a vapor film is formed between the partial volume and a wall of the feed line 3. This is based, in particular, on the so-called Leidenfrost effect. In this case, the walls of the feed line 3 are heated in such a way that this Leidenfrost effect occurs in a targeted manner. This produces a vapor film between the partial volume and the wall of the feed line 3. Due to the pressure gradient maintained by the metering pump 7, this partial volume is guided through the feed line 3 and the evaporator channel 4. In this case, the individual partial volumes are guided toward the evaporator surface 5. In the exemplary embodiment, this evaporator surface 5 is a wall of the evaporator channel 4. Changing the curvature and/or the cross section of the evaporator channel 4 which can be flowed through allows the partial volumes to impinge on the evaporator surface 5 as a function of the mass of the individual partial volumes. The fact that different partial volumes are added allows not only a partial region of the evaporator surface 5 to be utilized for evaporating the fluid, but rather a scattering of the evaporator surfaces 5 being used is also achieved. Further scattering is alternatively or additionally achieved by varying the volume adding rate of the fluid. The scattering of the evaporator surfaces 5 being used advantageously leads to the evaporator surface 5 being effectively utilized and, in particular during evaporation of relatively large predeterminable volumes of the fluid, the evaporator surface 5 is utilized uniformly. This leads to a significantly improved evaporation result since, in the case of substantially point-by-point utilization of the evaporator surface 5 and relatively large predeterminable volumes, the loss of heat within the device 1 is so great that it is not possible to ensure complete evaporation of the predeterminable volume. Furthermore, the temperature of the feed line 3 and/or of the evaporator channel 4 can be regulated accordingly to achieve as complete as possible evaporation of the fluid.

Thus, the procedure according to the invention advantageously prevents incomplete evaporation in which drops of the fluid issue unevaporated from the evaporator channel 4. The application of the individual partial volumes to a region of the evaporator surface 5, the position of which is varied as a function of the mass and/or the volume adding rate of the fluid of the corresponding partial volume, can be achieved by way of a plurality of measures. For example, the curvature and/or the cross section of the evaporator channel 4 to be flowed through in this case can be varied. Generally, use is made in this case of the inertia effects leading to different impingement regions on the evaporator surface 5, due to the different mass of the various partial volumes.

FIG. 1 shows in this case a first through-flow cross section 9 and a second through-flow cross section 10 of the evaporator channel 4. The first through-flow cross section 9 is larger than the second through-flow cross section 10. A vapor flow 13 of the evaporated fluid leaves the device 1.

Figure 2:
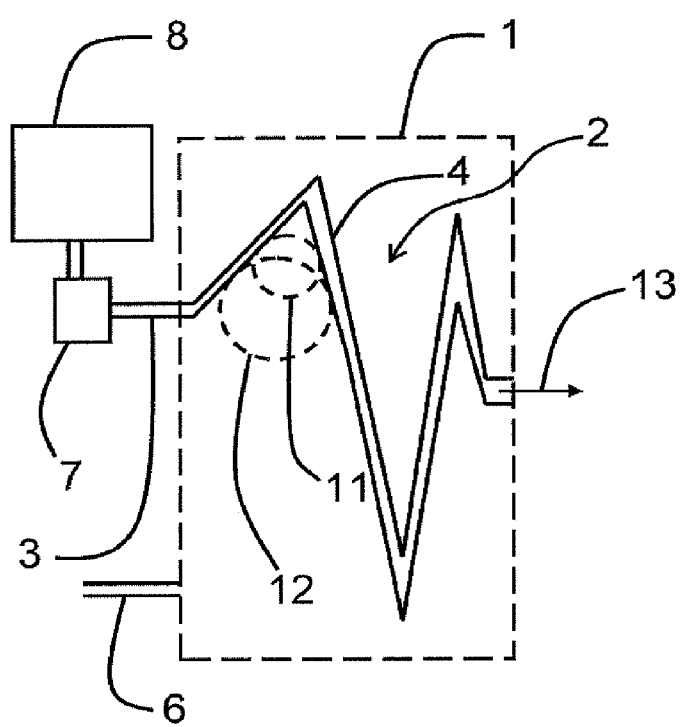
FIG. 2 is a view similar to FIG. 1 of an exemplary embodiment of a device according to the invention illustrating a radius of curvature.

FIG. 2 shows that the curvature of the evaporator channel 4 changes. A first circle of curvature 11 and a second circle of curvature 12 are indicated for this purpose. As may be seen, the radius of curvature changes in this case, leading to a mass-dependent deposition of the partial volumes on the evaporator surface 5 and thus to locally resolved evaporation of the individual partial volumes.

Figure 3:
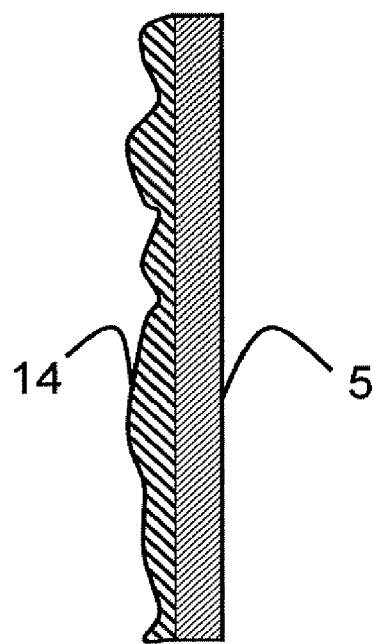
FIG. 3 is an enlarged, fragmentary, cross-sectional view of an exemplary embodiment of a device according to the invention with a porous coating on an evaporator surface.

FIG. 3 shows a portion of an exemplary embodiment in which the evaporator surface 5 has a porous coating 14 which catalyzes the hydrolysis of urea to form ammonia.

Figure 4:
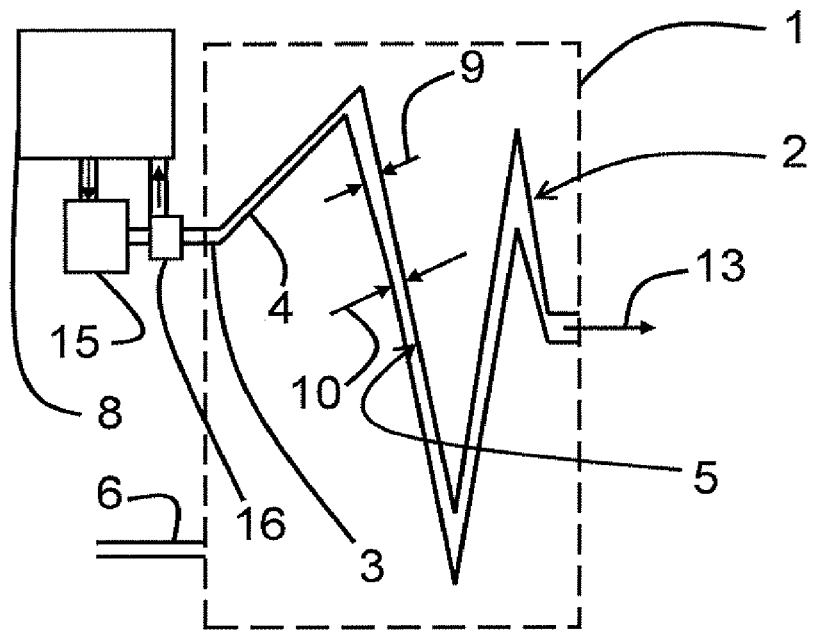
FIG. 4 is a view similar to FIGS. 1 and 2 of a second exemplary embodiment of a device according to the invention.

FIG. 4 shows an alternative exemplary embodiment of a device 1 according to the invention. Instead of a metering pump 7, the present exemplary embodiment has a conveying pump 15 through the use of which the urea/water solution is conveyed out of the reservoir 8. The addition of the urea/water solution to the feed line 3 is regulated through a regulatable 2/3-way valve 16. The urea/water solution can be guided either into the feed line 3 or back into the reservoir 8 through this valve 16. The volume adding rate of the fluid into the feed line 3 can be varied by way of the duration of the opening of the valve 16 up to the feed line 3, and also the amount which passes through the valve 16 into the feed line 3 and can be regulated by way of regulating the amount conveyed by the conveying pump 15.

Figure 5:
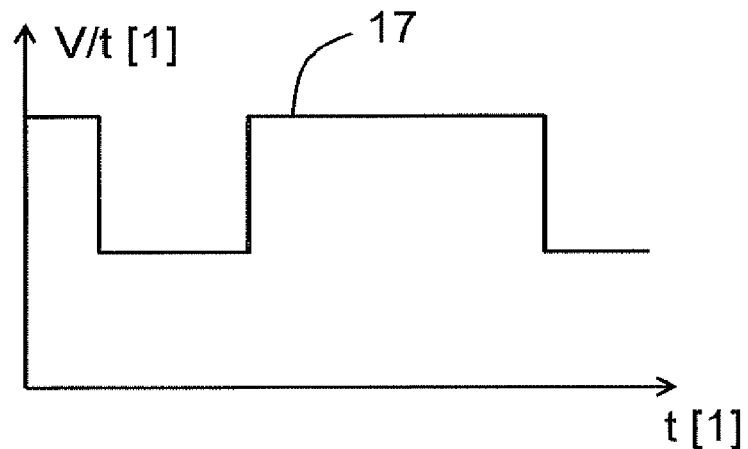
FIGS. 5 to 7 are graphs showing examples of variations of a volume adding rate of the fluid.
Figure 6:
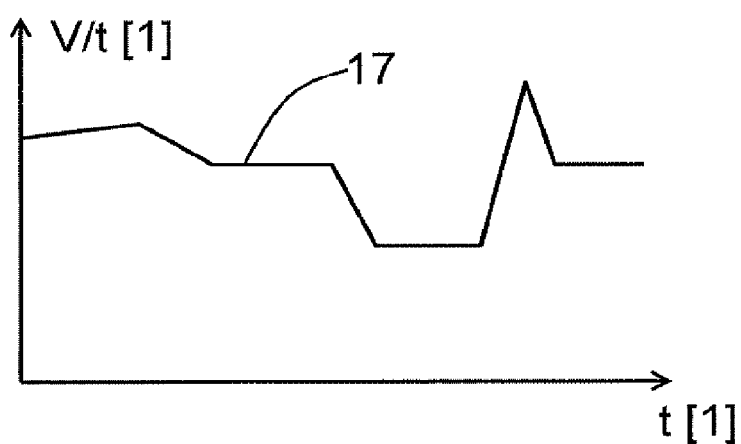
Figure 7:
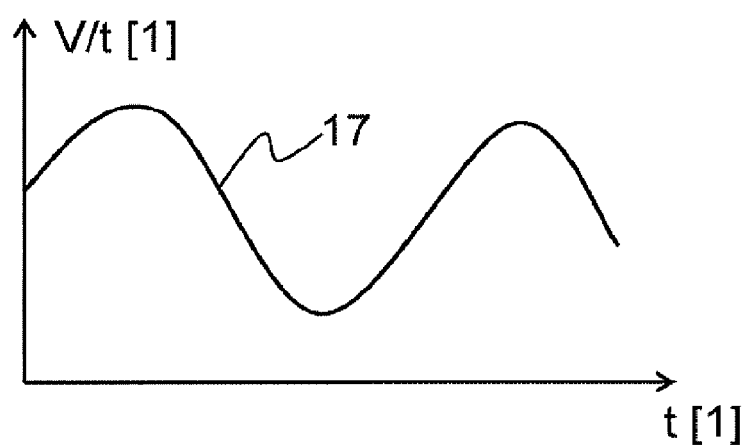

FIG. 5 shows a first example of a course of a volume adding rate 17 into the feed line 3 over time. This example can be achieved by way of the corresponding use of a conveying pump 15 and a valve 16, wherein the valve 16 can have different free through-flow cross sections. In this case, the amount of fluid entering the feed line 3 through the valve 16 is therefore regulatable per unit of time. The volume adding rate 17 can be controlled by varying the time period in which the valve 16 is opened or closed to the feed line 3 and by varying the amount of fluid flowing through the valve 16. The volume adding rate 17 can be varied accordingly, as shown in FIGS. 6 and 7, by way of a corresponding activation of the metering pump 7 and/or the conveying pump 15 as well as of the valve 16. In FIGS. 5 to 7, both time t and a volume adding rate V/t are indicated in arbitrary units.

The method according to the invention and the device 1 according to the invention advantageously allow evaporation of a fluid, in particular of a urea/water solution, that is as effective as possible. The utilization of the largest possible proportion of the evaporator surface 5 is achieved as a result of the mass and/or volume adding rate-dependent distribution or division of the impingement surfaces on the evaporator surface 5. For this purpose, a heating strategy is operated in an advantageous manner in the region of the feed line 3, which ensures that the Leidenfrost effect occurs each time the individual partial volumes are added. In this manner, a distribution which is as uniform as possible can be achieved by way of a corresponding configuration of the geometry of the evaporator channel 4.

The invention claimed is:

1. A device for evaporating a predeterminable volume of a fluid, the device comprising:
    a feed line configured to supply a urea and water solution as the fluid for providing ammonia as a reducing agent in an exhaust gas of internal combustion engines;
    an evaporator surface configured to receive the fluid through said feed line;
    an evaporator channel having a tortuous course, said evaporator channel having a surface included in said evaporator surface;
    at least one variable parameter selected from the group consisting of:
        a) a radius of curvature of said evaporator channel;
        b) a through-flow cross section of said evaporator channel; and
        c) a volume adding rate of the fluid;
    a dividing device for dividing, said dividing device configured for dividing the predeterminable volume of the fluid into individual partial volumes of different size before entering said feed line, said dividing device including a conveying pump and a regulatable valve or a metering pump;
    said conveying pump and said regulatable valve or said metering pump for regulating the delivery of the partial volumes to varying positions on a region of said evaporator surface, said conveying pump and said regulatable valve or said metering pump being configured for being controlled on the basis of at least one of the following parameters:
        i) a mass of a corresponding partial volume, or
        ii) a volume adding rate of the corresponding partial volume.

2. The device according to claim 1, wherein at least a part of said evaporator channel includes a porous coating.

3. The device according to claim 1, wherein at least a part of said evaporator channel includes a coating catalyzing a hydrolysis of a reducing agent precursor to form a reducing agent.

4. The device according to claim 1, which further comprises a reservoir, said pump for conveying the fluid from said reservoir into said feed line.

5. The device according to claim 1, wherein said parameter variability of at least one of the radius of curvature of said evaporator channel or the through-flow cross section of said evaporator channel or the volume adding rate of the fluid, causes the differently sized partial volumes of the predeterminable volume to impinge at different points of said evaporator surface due to inertia effects.

6. The device according to claim 1, wherein said at least one controllable valve is a regulatable 2/3-way valve configured to guide the urea and water solution into said feed line or back into said reservoir through said valve.

7. The device according to claim 1, wherein said at least one controllable valve has different free through-flow cross sections configured to regulate an amount of fluid entering said feed line through said valve per unit time.

8. The device according to claim 1, wherein said feed line and said evaporator channel are formed of a material being corrosion-resistant upon an addition and evaporation of a urea/water solution.

9. The device according to claim 8, wherein said material of said feed line and said evaporator channel includes at least one of the following materials:
 a) aluminum or
 b) titanium.

* * * * *